United States Patent Office 3,395,227
Patented July 30, 1968

3,395,227
SYNERGISTIC BICYCLO[2.2.1] - 5 - HEPTENE - 2,3-DICARBOXIMIDOMETHYL CHRYSANTHEMUM-CARBOXYLATE INSECTICIDAL COMPOSITION
John L. Neumeyer, Wayland, Mass., assignor to Arthur D. Little Inc., Cambridge, Mass., a corporation of Massachusetts
No Drawing. Filed Nov. 9, 1965, Ser. No. 507,028
2 Claims. (Cl. 424—282)

ABSTRACT OF THE DISCLOSURE

A new chemical compound which is identified as bicyclo[2.2.1]-5-heptene-2,3-dicarboximidomethyl chrysanthemumcarboxylate. In conjunction with known synergists, it is an effective insecticide in combating houseflies, roaches, and other insects.

---

Among the most widely used insecticides today are the pyrethrins, the active principle of pyrethrum flowers (*Chrysanthemum cinnerariaefolium*), which have a high order or insecticidal activity and a low mammalian toxicity. The high cost and the uncertain supply of pyrethrins have encouraged attempts to prepare synthetic insecticides which retain the desirable properties of pyrethrins. It has long been known that synthetic products having a basic structural similarity to pyrethrins in that they are esters of 2,2-dimethyl - 3 - (2-methylpropenyl)cyclopropanecarboxylic acid (which is also known as chrysanthemumic acid and will be so referred to herein), exhibit insecticidal activity of a significant order. One of these synthetic pyrethroids was described by Lafarge and Schecter, U.S. Patent 2,661,374, and is known as Allethrin. Substantial efforts have been expended to increase the effectiveness of this synthetic pyrethroid by finding an effective synergist for Allethrin. These additives, commonly called synergists, are agents which may or may not themselves exhibit insecticidal activity but when combined with pyrethrins or related compounds produce new insecticides having an effectiveness significantly greater than the sum of the effectiveness of the components when used separately. One of the most widely used of the pyrethrins synergists is the compound piperonyl butoxide, α-[2-(butoxyethoxy) - ethoxy]-4,5-(methylenedioxy)-2-propyltoluene, which is described in synergistic combination with pyrethrins in Wach's U.S. Patent 2,550,737. It has been found that many compounds which are excellent synergists for pyrethrins are not nearly as effective when used with allethrin or other synthetic cyclopropanecarboxylic acid esters.

We have now discovered that bicyclo[2.2.1]-5-heptene-2,3-dicarboximidomethyl chrysanthemumcarboxylate represented by the formula

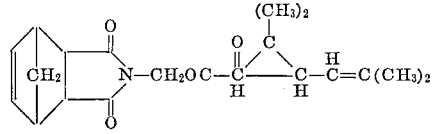

is effectively synergized by such known synergists as piperonyl butoxide. In such a composition of matter it is an extremely effective insecticide against flies.

The need for effective insecticides in universally recognized. Such insecticides, in destroying a wide variety of insects, prevent the spread of disease and the destruction of valuable crops. More particularly, there is a need for an inexpensive safe insecticide for controlling houseflies. Such an insecticide should be one which is capable of knocking down and paralyzing the flies when contacted with a spray containing dilute concentrations of the active material.

It is therefore a primary object of this invention to provide a new chemical compound suitable for use as an insecticide, and particularly for use against flies. It is another object of this invention to provide such a compound which in combination with known synergists is an extremely effective contact insecticide. It is a further object of this invention to provide an insecticide which may be totally synthesized and be supplied for a cost considerably below the presently-used pyrethrum-containing insecticides. Other objects of the invention will in part be obvious and will in part be apparent hereinafter.

The invention accordingly comprises a composition of matter possessing the characteristics, properties, and the relation of components and the method of its use which will be exemplified in the composition and method hereinafter described, and the scope of the invention will be indicated in the claims.

The following example illustrates the method of preparing the bicyclo[2.2.1]-5-heptene - 2,3 - dicarboximidomethyl chrysanthemumcarboxylate of this invention.

EXAMPLE 18.6 grams (0.1 mole) of chrysanthemum monocarboxylic acid chloride was slowly added to a solution of 19.3 grams (0.1 mole) of N-(hydroxymethyl)bicyclo [2.2.1]-5-heptene-2,3-dicarboximide in 300 milliliters of benzene and 8.7 grams of dry pyridine. (The N-(hydroxymethyl)bicyclo[2.2.1]-5-heptene - 2,3 - dicarboximide was prepared by refluxing bicyclo[2.2.1]-5-heptene-2,3-dicarboximide with formaldehyde according to the procedure given in J. Drābek Chem. Zvesti 12 29 (1958) (see C.A. 52 13705 (1958)). The mixture of reactants was maintained at about 50° C. and stirred for 23 hours.

The reaction by which the bicyclo[2.2.1]-5-heptene-2,3-dicarboximidomethyl chrysanthemumcarboxylate was formed may be represented as follows:

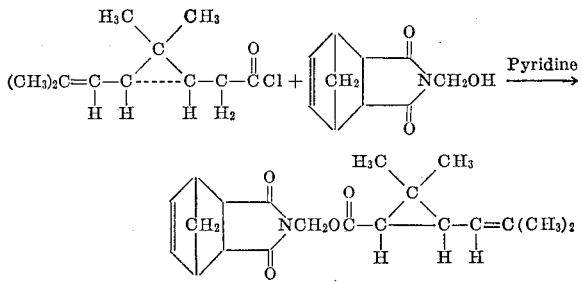

The resulting reaction mixture was then washed successively with 100 milliliters of 5% hydrochloric acid, 5% sodium hydroxide and 100 milliliters of water. The benzene mixture was then dried over anhydrous sodium sulfate, and the benzene distilled off at reduced pressure. The remaining yellow oil was distilled at 0.1 mm., the product distilling at 175–185° C. being collected. $n_D^{27}$ 1.5145.

*Analysis.*—Calculated for $C_{20}H_{25}NO_4$: C, 69.95; H, 7.33; N, 4.08. Found: C, 69.64; H, 7.57; N, 3.53.

The bicyclo[2.2.1]-5-heptene-2,3-dicarboximidomethyl chrysanthemumcarboxylate was dissolved in acetone and then dispersed in distilled water with a nonionic surfactant (isooctyl phenyl polyethoxy ethanol) as an emulsifying agent. Using a percent weight/volume concentration of 0.2, the dispersion was sprayed on 50 adult houseflies in accordance with standard test procedure. This resulted in a 50% knockdown at the end of two hours. However, none of the flies were killed.

A known synergist, piperonyl butoxide, was then added to the 0.2% water dispersion in a quantity to provide 0.2% weight/volume concentration of the synergist. This insecticide was then sprayed on 50 more houseflies (*Musca domestica*) with the result that there was 100% knockdown after 2 hours and 100% mortality after 24 hours. An equally effective control of houseflies was exhibited by an insecticidal spray containing 0.1% of the bicyclo[2.2.1]-5-heptene-2,3-dicarboximidomethyl chrysanthemum-carboxylate and 0.2% of the synergist. The synergist alone had no effect on the flies.

If the insecticide of this invention is not combined with a synergist, then it should be made up in a liquid spray in concentrations of at least 0.2% weight by spray volume. If a synergist is used, the insecticide concentration may be as low as 0.1%. Other known synergists, such as n-octyl sulfoxide of isosafrole, N-(2-ethylhexyl)bicyclo[2.2.1]-5-heptene-2,3-dicarboximide, n-propyl isome, and piperonyl cyclonene, may be combined with the insecticide of this invention. Normally, they will be used in concentrations of at least 0.2%. Liquids other than water may be used as the medium used to effect contact with the insects. Such liquids may include, but are not limited to, deodorized kerosenes, naphthas, isoparaffinic hydrocarbons, toluene, cyclohexanone, acetone and the like. Mixed solvents or dispersants may also be used.

It is apparent that it is possible to formulate a wholly synthetic, effective insecticide by the practice of this invention. The insecticide is particularly effective against houseflies.

It will thus be seen that the objects set forth above, among those made apparent from the preceding description, are efficiently attained and, since certain changes may be made in the above composition of matter without departing from the scope of this invention, it is intended that all matter contained in the above description shall be interpreted as illustrative and not in a limiting sense.

I claim:
1. An insecticidal composition consisting essentially of an insecticidal amount of bicyclo[2.2.1]-5-heptene-2,3-dicarboximidomethyl chrysanthemumcarboxylate as the active insecticide and a synergist selected from the group consisting of piperonyl butoxide, n-octyl sulfoxide of isosafrole, N-(2-ethylhexyl)bicyclo[2.2.1]-5-heptene-2,3-dicarboximide, n-propyl isome, and piperonyl cyclonene in a liquid medium.

2. An insecticidal composition in accordance with claim 1 wherein said bicyclo[2.2.1]-5-heptene-2,3-dicarboximidomethyl chrysanthemumcarboxylate is present in a concentration of at least 0.1% weight/volume and said synergist is piperonyl butoxide present in a concentration of at least 0.2% weight/volume.

References Cited

UNITED STATES PATENTS

| 2,553,770 | 5/1951 | Kittleson | 260—326 |
| 2,706,700 | 4/1955 | Graham | 167—24 |
| 2,545,283 | 3/1951 | Johnson | 167—33 |

OTHER REFERENCES

Chem. Abstracts, 61, p. 13251 C (1964).

ALBERT T. MEYERS, *Primary Examiner.*

R. S. BARRESE, *Assistant Examiner.*